(12) United States Patent
Mukhedkar et al.

(10) Patent No.: US 11,251,722 B2
(45) Date of Patent: Feb. 15, 2022

(54) CONVERTER SCHEME

(71) Applicant: GENERAL ELECTRIC TECHNOLOGY GMBH, Baden (CH)

(72) Inventors: Radnya Anant Mukhedkar, Stafford (GB); Gearoid Sean O'Heidhin, Staffordshire (GB); Amit Kumar, Noida (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/754,010

(22) PCT Filed: Oct. 5, 2018

(86) PCT No.: PCT/EP2018/077154
§ 371 (c)(1),
(2) Date: Apr. 6, 2020

(87) PCT Pub. No.: WO2019/068874
PCT Pub. Date: Apr. 11, 2019

(65) Prior Publication Data
US 2020/0266721 A1   Aug. 20, 2020

(30) Foreign Application Priority Data
Oct. 6, 2017   (IN) .............................. 201741035540

(51) Int. Cl.
*H02J 3/36*     (2006.01)
*H02M 5/42*    (2006.01)
*H02M 7/757*   (2006.01)

(52) U.S. Cl.
CPC ............. *H02M 7/7575* (2013.01); *H02J 3/36* (2013.01); *H02M 5/42* (2013.01)

(58) Field of Classification Search
CPC ...... H02J 3/36; H02M 2001/007; H02M 5/42; H02M 7/483; H02M 7/487; H02M 7/7575
See application file for complete search history.

(56) References Cited

U.S. PATENT DOCUMENTS

2013/0128631 A1   5/2013   Yang et al.
2014/0092660 A1*  4/2014   Zhang .................. H02M 7/487
                                                                363/127

(Continued)

FOREIGN PATENT DOCUMENTS

WO   2012/013248 A1   2/2012
WO   2015/148977 A1   10/2015

OTHER PUBLICATIONS

International Search Report of PCT/EP2018/077154 dated Dec. 5, 2018.

(Continued)

*Primary Examiner* — Fred E Finch, III
(74) *Attorney, Agent, or Firm* — Eversheds Sutherland (US) LLP (57) ABSTRACT

A converter scheme (30) comprises a plurality of poles and a plurality of converters (32), the plurality of poles (60,62, 64) including at least one positive pole (60), at least one negative pole (62) and a neutral pole (64), the plurality of converters (32) including at least one first converter (32*a*) and at least one second converter (32*b*), the or each first converter (32*a*) connected to the neutral pole (64) and the or the respective positive pole (60), the or each first converter (32*a*) operable to control a converter voltage across the neutral pole (64) and the corresponding positive pole (60), the or each second converter (32*b*) connected to the neutral pole (64) and the or the respective negative pole (62), the or each second converter (32*b*) operable to control a converter voltage across the neutral pole (64) and the corresponding (Continued)

negative pole (62), wherein the converter scheme (30) includes a controller (36) programmed to perform a voltage control mode when there is an imbalance between power or current levels of the positive and negative poles (60,62) and when the neutral pole (64) is at a non-zero potential, the controller (36) programmed to perform the voltage control mode to operate each converter (32a,32b) to control the corresponding converter voltage so that a pole-to-ground voltage of the corresponding positive or negative pole (60,62) is equal to or lower than a voltage rating of the corresponding positive or negative pole (60,62).

15 Claims, 7 Drawing Sheets

(56) References Cited

U.S. PATENT DOCUMENTS

| | | | | |
|---|---|---|---|---|
| 2014/0092661 A1* | 4/2014 | Zhang | ............ | H02M 7/487 |
| | | | | 363/131 |
| 2014/0198533 A1* | 7/2014 | Bala | ............ | H02M 7/483 |
| | | | | 363/16 |
| 2015/0003134 A1* | 1/2015 | Trainer | ............ | H02J 3/36 |
| | | | | 363/132 |
| 2015/0256093 A1* | 9/2015 | Gupta | ............ | H02M 7/521 |
| | | | | 363/35 |
| 2017/0214310 A1* | 7/2017 | Zhang | ............ | H02M 1/083 |
| 2017/0331390 A1* | 11/2017 | Xu | ............ | H02M 5/4585 |
| 2018/0115152 A1* | 4/2018 | Gupta | ............ | G01R 31/52 |
| 2018/0145499 A1* | 5/2018 | Gupta | ............ | H02H 3/16 |
| 2018/0366942 A1* | 12/2018 | Gupta | ............ | H02H 7/1216 |
| 2019/0181774 A1* | 6/2019 | Liu | ............ | H02M 7/53873 |
| 2020/0251906 A1* | 8/2020 | Jiang-Hafner | ............ | H02J 3/36 |
| 2020/0358348 A1* | 11/2020 | Halfmann | ............ | H02M 7/217 |

OTHER PUBLICATIONS

European Search Report of European Application No. 17192713.0 dated Mar. 22, 2018.

\* cited by examiner

CONVERTER SCHEME

CROSS-REFERENCE TO RELATED APPLICATIONS

This application is a U.S. National Stage Application under 35 U.S.C. 371 and claims the priority benefit of International Application No. PCT/EP2018/077154, filed Oct. 5, 2018, which claims priority to EP 201741035540, filed Oct. 6, 2017, which are both incorporated herein by reference.

FIELD OF THE INVENTION

This invention relates to a converter scheme comprising a plurality of converters, in particular a converter scheme having a high impedance conductor between neutral pole and ground, preferably for use in high voltage direct current power transmission and distribution.

BACKGROUND OF THE INVENTION

It is known to operate a converter scheme comprising a plurality of converters.

BRIEF DESCRIPTION OF THE INVENTION

According to a first aspect of the invention, there is provided a converter scheme comprising a plurality of poles and a plurality of converters, the plurality of poles including at least one positive pole, at least one negative pole and a neutral pole, the plurality of converters including at least one first converter and at least one second converter, the or each first converter connected to the neutral pole and the or the respective positive pole, the or each first converter operable to control a converter voltage across the neutral pole and the corresponding positive pole, the or each second converter connected to the neutral pole and the or the respective negative pole, the or each second converter operable to control a converter voltage across the neutral pole and the corresponding negative pole, wherein the converter scheme includes a controller programmed to perform a voltage control mode when there is an imbalance between power or current levels of the positive and negative poles and when the neutral pole is at a non-zero potential, the controller programmed to perform the voltage control mode to operate each converter to control the corresponding converter voltage so that a pole-to-ground voltage of the corresponding positive or negative pole is equal to or lower than a voltage rating of the corresponding positive or negative pole.

The converter scheme of the invention may include, but is not limited to, a bipolar converter arrangement for use in a bipolar power transmission scheme. Alternatively or additionally the converter scheme of the invention may include, but is not limited to, a multi-terminal converter arrangement which comprises multiple first converters connected in parallel and/or multiple second converters connected in parallel.

The voltage rating of each of the positive and negative poles may be defined by the voltage rating of power transmission equipment connected thereto or associated therewith.

In use, each of the first and second converters is operated to control the respective converter voltage across the neutral pole and the corresponding positive or negative pole in order to facilitate power transmission under balanced operating conditions in which the power or current levels of the positive and negative poles are balanced and in which the neutral pole is at a zero potential. The converter voltages provided by the first and second converters are typically defined by user requirements which include maintenance of constant levels of the converter voltages throughout the power transmission.

The inclusion of the controller in the converter scheme of the invention improves the reliability and availability of the converter scheme by enabling the converter scheme to facilitate power transmission under unbalanced operating conditions in which the power or current levels of the positive and negative poles are unbalanced and in which the neutral pole is at a non-zero potential. This is because, although the unbalanced operating conditions create the risk of exceeding the voltage rating of at least one positive or negative pole, the controller is able to automatically perform the voltage control mode during the unbalanced operating conditions to ensure that the voltage ratings of the positive and negative poles are not exceeded. Otherwise omission of the controller from the converter scheme would require a shutdown of the converter scheme until the balanced operating conditions are restored, since operation of the converter scheme under unbalanced operating conditions cannot be permitted due to the risk of exceeding the voltage rating of at least one positive or negative pole, or would require a reduction in power of the pole operating at the higher power level to be the same as the power of the pole operating at the lower power level, thus adversely affecting the overall power capability of the converter scheme.

In addition the performance of the voltage control mode enables the converter scheme to employ converter voltages which have the effect of optimising operating losses of the converter scheme arising from the unbalanced operating conditions when compared to the unoptimized scenario in which the converter scheme under the unbalanced operating conditions continues to employ the converter voltages which were also used during the balanced operating conditions.

A change in the imbalance between the power or current levels of the positive and negative poles may arise as a result of, for example, a change in one or more operating parameters or a change in configuration of the converter scheme. It may be that the converter voltages used in the voltage control mode under the previous unbalanced operating conditions may result in a suboptimal performance of the converter scheme (such as higher losses, higher voltage stress and reduced lifetime) under the new unbalanced operating conditions. The change in configuration of the converter scheme may arise as a result of a change in the number of in-service conductors associated with the neutral pole (which changes the impedance of the neutral pole) and/or a change in the number of parallel-connected converters.

In embodiments of the invention, the controller may be programmed to perform the voltage control mode to operate each converter to update the corresponding converter voltage in real-time in response to a change in the imbalance between the power or current levels of the positive and negative poles so that the pole-to-ground voltage of the corresponding positive or negative pole is equal to or lower than the voltage rating of the corresponding positive or negative pole.

Programming the controller in the above manner enables the controller to operate each converter to dynamically control the corresponding converter voltage to maintain the pole-to-ground voltage of the corresponding positive or negative pole at a level that is equal to or lower than the voltage rating of the corresponding positive or negative pole even during a change in the unbalanced operating conditions of the converter scheme.

In further embodiments of the invention, the controller may be programmed to perform the voltage control mode to operate at least one of the converters to reduce the corresponding converter voltage and increase a current of the corresponding positive or negative pole so that the pole-to-ground voltage of the corresponding positive or negative pole is equal to or lower than the voltage rating of the corresponding positive or negative pole. This ensures that the ability of the converter scheme to deliver the required power via the corresponding positive or negative pole is not affected by the reduction in the corresponding converter voltage.

The voltage control mode may vary depending on the number of first converters and the number of second converters. It will be appreciated that the number of first converters ranges from one to many and that the number of second converters ranges from one to many.

In embodiments of the invention, the number of first converters may be equal to the number of second converters. In such embodiments, the controller may be programmed to perform the voltage control mode when there is an imbalance between:

a power or current level of the positive pole and a power or current level of the negative pole when there are a single positive pole and a single negative pole; or a sum of power or current levels of the positive poles and a sum of power or current levels of the negative poles when there are multiple positive poles and multiple negative poles.

The above unbalanced operating conditions may arise when it is necessary to operate the positive and negative poles at different power levels for a period of time during, for example, testing/commissioning and/or maintenance of the converter scheme. The above unbalanced operating conditions may also arise when the power capability of at least one of the first and second converters is reduced due to, for example, an outage in the associated cooling system or derating of the associated equipment because of partial outage etc.

In other embodiments of the invention, the number of first converters may be unequal to the number of second converters. In such embodiments, the controller may be programmed to perform the voltage control mode when there is an imbalance between:

a sum of power or current levels of the positive poles and a power or current level of the negative pole when there are multiple positive poles and a single negative pole;

a power or current level of the positive pole and a sum of power or current levels of the negative poles when there are a single positive pole and multiple negative poles; or a sum of power or current levels of the positive poles and a sum of power or current levels of the negative poles when there are multiple positive poles and multiple negative poles.

The above unbalanced operating conditions may arise when one or more poles are out of service due to a breakdown or due to maintenance. The above unbalanced operating conditions may also arise when the requirements of the converter scheme include different power demands between the first converter(s) and the second converter(s).

The controller may be programmed to perform the voltage control mode to operate at least one of the converters to vary the corresponding converter voltage during a change in power or current level of at least one of the positive and negative poles and when there is an imbalance between the power or current levels of the positive and negative poles during the change in power or current level of the at least one of the positive and negative poles.

The above unbalanced operating conditions may arise when the at least one of the positive and negative poles is undergoing a change in power or current level which creates a temporary imbalance between the power or current levels of the positive and negative poles. The change in power or current level of the at least one of the positive and negative poles may take the form of an increase in power or current level of the at least one of the positive and negative poles after the corresponding converter is deblocked, or a decrease in power or current level of the at least one of the positive and negative poles before the corresponding converter is to be blocked.

The converter scheme of the invention is therefore able to perform the voltage control mode to facilitate power transmission across a wide range of unbalanced operating conditions.

In a preferred embodiment of the invention, the controller may be programmed to use the non-zero potential of the neutral pole as a reference value in the voltage control mode to operate at least one of the converters to control the corresponding converter voltage so that the pole-to-ground voltage of the corresponding positive or negative pole is equal to or lower than the voltage rating of the corresponding positive or negative pole.

Programming the controller in this manner provides a reliable means of controlling the converter voltages in the voltage control mode to avoid the risk of exceeding the voltage rating of the corresponding positive or negative pole.

The controller may be programmed to obtain or determine one or more operating parameters of the neutral pole and to use the or each obtained or determined operating parameter of the neutral pole to determine the non-zero potential of the neutral pole. For example, a given operating parameter may be received from a measuring device that is configured to directly measure the given operating parameter of the neutral pole, or a given operating parameter of the neutral pole may be calculated, predicted or modelled by the controller based on the operating parameters of the converter scheme.

The determination of the non-zero potential of the neutral pole may be carried out by way of calculation, prediction or modelling. The operating parameter of the neutral pole may relate to the impedance of the conductor(s) associated with the neutral pole, which is dependent on the number of parallel-connected conductors in service, conductor temperature, and current flowing through the conductor(s). The impedance of the conductor(s) associated with the neutral pole may be chosen from a periodically updated lookup table or may be calculated in real time.

A change in the non-zero potential of the neutral pole may arise as a result of, for example, a change in one or more operating parameters of the neutral pole. The controller may be programmed to update the determined non-zero potential of the neutral pole in real-time in response to at least one change in operating parameter of the neutral pole. This ensures that the reference value accurately reflects the actual non-zero potential of the neutral pole in order to reliably achieve the desired control of the converter voltages in the voltage control mode, thus enabling the controller to operate the converters to dynamically control the converter voltages in the voltage control mode in response to the at least one change in operating parameter of the neutral pole.

The controller may be programmed to obtain or determine a current of the neutral pole and to use the obtained or determined current of the neutral pole to determine the non-zero potential of the neutral pole.

The converter scheme may further include a conductor connected to the neutral pole, where the conductor may be connected to ground potential. More specifically, the converter scheme may include at least one conductor connected to the neutral pole, where the or each conductor is in the form of, for example, a dedicated metallic return or an electrode line. Furthermore the converter scheme may include multiple conductors connected to the neutral pole and connected in parallel, with the converter scheme being operable with one or multiple conductors in service.

When the converter scheme includes a conductor connected to the neutral pole, the controller may be programmed to obtain or determine a resistance or impedance of the conductor and to use the obtained or determined resistance or impedance of the conductor to determine the non-zero potential of the neutral pole.

A change in the resistance or impedance of the conductor may arise as a result of, for example, a change in one or more operating parameters of the conductor. The controller may be programmed to update the obtained or determined resistance or impedance of the conductor in real-time in response to at least one change in operating parameter of the conductor. This ensures that the reference value accurately reflects the actual non-zero potential of the neutral pole in order to reliably achieve the desired control of the converter voltages in the voltage control mode, thus enabling the controller to dynamically control the converter voltages in the voltage control mode in response to the at least one change in operating parameter of the conductor.

The converter scheme may further include a measurement device configured to measure an electrical characteristic of the conductor to obtain the resistance or impedance of the conductor. The controller may be programmed to use the obtained resistance or impedance of the conductor to update a procedure of determining the resistance or impedance of the conductor. This provides the controller with an intelligent learning mechanism which ensures accurate determination of the non-zero potential of the neutral pole based on the obtained or determined resistance or impedance of the conductor.

The controller may be programmed to obtain or determine a maximum resistance or impedance of the conductor and to use the obtained or determined maximum resistance or impedance of the conductor to determine the non-zero potential of the neutral pole.

Using the maximum resistance or impedance of the conductor simplifies the determination of the non-zero potential of the neutral pole for use in the voltage control mode, while using the actual resistance or impedance of the conductor allows for a more optimal power transmission performance of the converter scheme but requires a more complex determination of the non-zero potential of the neutral pole for use in the voltage control mode.

According to a second aspect of the invention, there is provided a method of operating a converter scheme, the converter scheme comprising a plurality of poles and a plurality of converters, the plurality of poles including at least one positive pole, at least one negative pole and a neutral pole, the plurality of converters including at least one first converter and at least one second converter, the or each first converter connected to the neutral pole and the or the respective positive pole, the or each second converter connected to the neutral pole and the or the respective negative pole, wherein the method includes the steps of:

operating the or each first converter to control a converter voltage across the neutral pole and the corresponding positive pole;

operating the or each second converter to control a converter voltage across the neutral pole and the corresponding negative pole; and when there is an imbalance between power or current levels of the positive and negative poles and when the neutral pole is at a non-zero potential, performing a voltage control mode to operate each converter to control the corresponding converter voltage so that a pole-to-ground voltage of the corresponding positive or negative pole is equal to or lower than a voltage rating of the corresponding positive or negative pole.

The advantages of the converter scheme of the first aspect of the invention and its embodiments apply mutatis mutandis to the method of the second aspect of the invention and its embodiments.

The method of the invention may include the step of performing the voltage control mode to operate each converter to update the corresponding converter voltage in real-time in response to a change in the imbalance between the power or current levels of the positive and negative poles so that the pole-to-ground voltage of the corresponding positive or negative pole is equal to or lower than the voltage rating of the corresponding positive or negative pole.

The method of the invention may include the step of performing the voltage control mode to operate at least one of the converters to reduce the corresponding converter voltage, and optionally increase a current of the corresponding positive or negative pole, so that:

the pole-to-ground voltage of the corresponding positive or negative pole is equal to or lower than the voltage rating of the corresponding positive or negative pole; and/or a current in the neutral pole (66) is equal to or lower than the current rating of a conductor of the neutral pole (66).

The increase in current of the corresponding positive or negative pole is to maintain a desired level of power from the or each corresponding converter.

In embodiments of the method of the invention, the number of first converters may be equal to the number of second converters. In such embodiments, the method of the invention may include the step of performing the voltage control mode when there is an imbalance between:

a power or current level of the positive pole and a power or current level of the negative pole when there are a single positive pole and a single negative pole; or a sum of power or current levels of the positive poles and a sum of power or current levels of the negative poles when there are multiple positive poles and multiple negative poles.

In other embodiments of the method of the invention, the number of first converters may be unequal to the number of second converters. In such embodiments, the method of the invention may include the step of performing the voltage control mode when there is an imbalance between:

a sum of power or current levels of the positive poles and a power or current level of the negative pole when there are multiple positive poles and a single negative pole;

a power or current level of the positive pole and a sum of power or current levels of the negative poles when there are a single positive pole and multiple negative poles; or a sum of power or current levels of the positive poles and a sum of power or current levels of the negative poles when there are multiple positive poles and multiple negative poles.

The method of the invention may include the step of performing the voltage control mode to operate at least one of the converters to vary the corresponding converter voltage during a change in power or current level of at least one of the positive and negative poles and when there is an imbalance between the power or current levels of the positive and negative poles during the change in power or current level of the at least one of the positive and negative poles.

The method of the invention may include the step of using the non-zero potential of the neutral pole as a reference value in the voltage control mode to operate at least one of the converters to control the corresponding converter voltage so that the pole-to-ground voltage of the corresponding positive or negative pole is equal to or lower than the voltage rating of the corresponding positive or negative pole.

The method of the invention may include the steps of: obtaining or determining one or more operating parameters of the neutral pole; and using the or each obtained or determined operating parameter of the neutral pole to determine the non-zero potential of the neutral pole.

The method of the invention may include the step of updating the determined non-zero potential of the neutral pole in real-time in response to at least one change in operating parameter of the neutral pole.

The method of the invention may include the steps of: obtaining or determining a current of the neutral pole; and using the obtained or determined current of the neutral pole to determine the non-zero potential of the neutral pole.

When the converter scheme further includes a conductor connected to the neutral pole, the method of the invention may include the steps of: obtaining or determining a resistance or impedance of the conductor; and using the obtained or determined resistance or impedance of the conductor to determine the non-zero potential of the neutral pole.

The method of the invention may include the step of updating the obtained or determined resistance or impedance of the conductor in real-time in response to at least one change in operating parameter of the conductor.

When the converter scheme further includes a measurement device configured to measure an electrical characteristic of the conductor to obtain the resistance or impedance of the conductor, the method of the invention may include the step of using the obtained resistance or impedance of the conductor to update a procedure of determining the resistance or impedance of the conductor.

The method of the invention may include the steps of: obtaining or determining a maximum resistance or impedance of the conductor; and using the obtained or determined maximum resistance or impedance of the conductor to determine the non-zero potential of the neutral pole.

It will be appreciated that the use of the terms "first" and "second", and the like, in this patent specification is merely intended to distinguish between similar features (e.g. the first and second converters), and is not intended to indicate the relative importance of one feature over another feature, unless otherwise specified.

BRIEF DESCRIPTION OF THE DRAWINGS OF THE INVENTION

Preferred embodiments of the invention will now be described, by way of non-limiting examples, with reference to the accompanying drawings in which.

DETAILED DESCRIPTION

Figure 1:
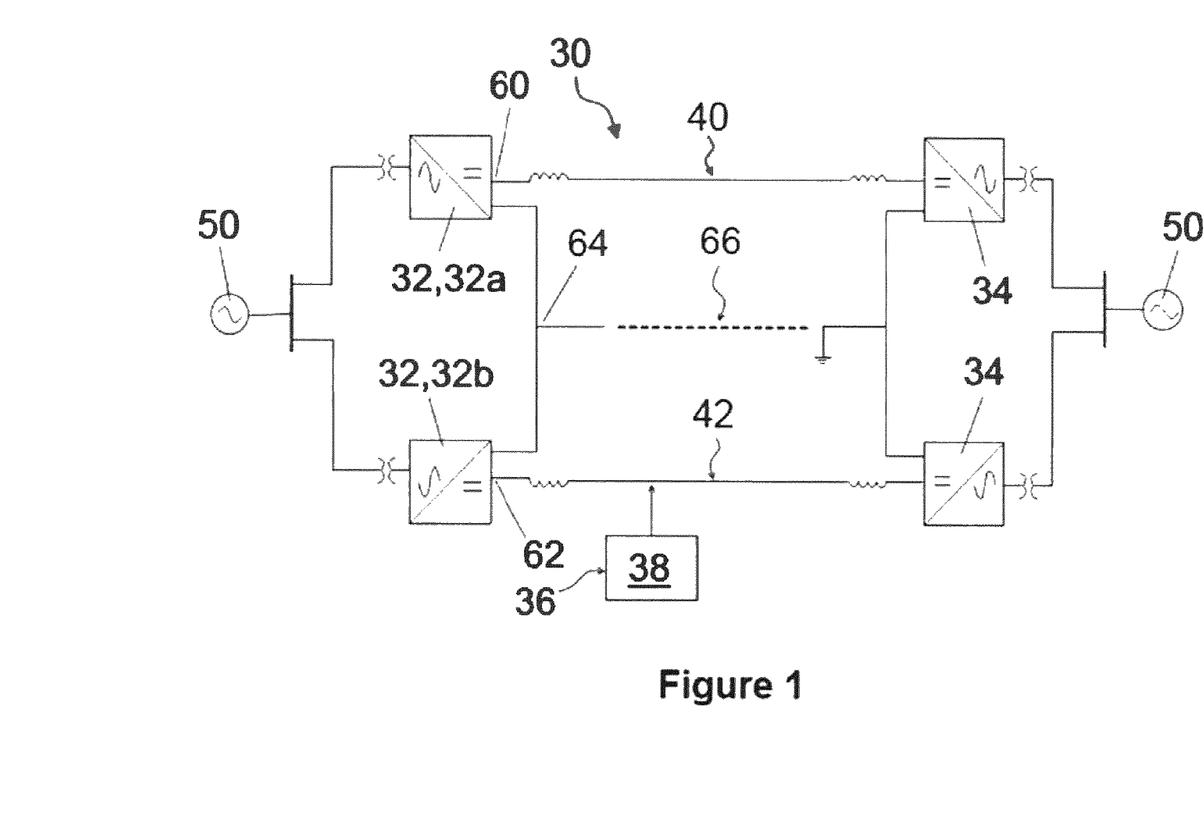
FIG. 1 shows schematically a converter scheme according to a first embodiment of the invention.

A bipolar converter scheme according to a first embodiment of the invention is shown in FIG. 1, and is designated generally by the reference numeral 30. Preferably the bipolar converter scheme is rated for use in high voltage direct current transmission.

The bipolar converter scheme 30 comprises a plurality of poles, a plurality of first and second converters 32, a plurality of third converters 34, and a controller 36. For clarity, each first converter is also labelled as 32a and each second converter is also labelled as 32b in the figures.

For the purposes of simplicity, the controller 36 of the bipolar converter scheme of FIG. 1 is exemplarily described with reference to its implementation as a single control unit 38. The configuration of the controller 36 may vary depending on specific requirements of the bipolar converter scheme 30. For example, the controller 36 may include a global control unit for controlling a plurality of converters 32,34, at least one local control unit for controlling the bipolar converter scheme 30, at least one local control unit for controlling at least one converter 32,34, or a combination thereof. The global control unit may be located remotely from each converter 32,34 and may be configured to communicate with each converter 32,34 via telecommunications links. The or each local control unit may be located in the vicinity of at least one converter 32,34. The global control unit may be configured to communicate with at least one local control unit via telecommunications links. In the case of multiple local control units, each local control unit may be configured to communicate with at least one other local control unit via telecommunications links The bipolar converter scheme 30 includes a first DC power transmission line 40 extending between first and second ends, and a second DC power transmission line 42 extending between first and second ends.

Figure 2:
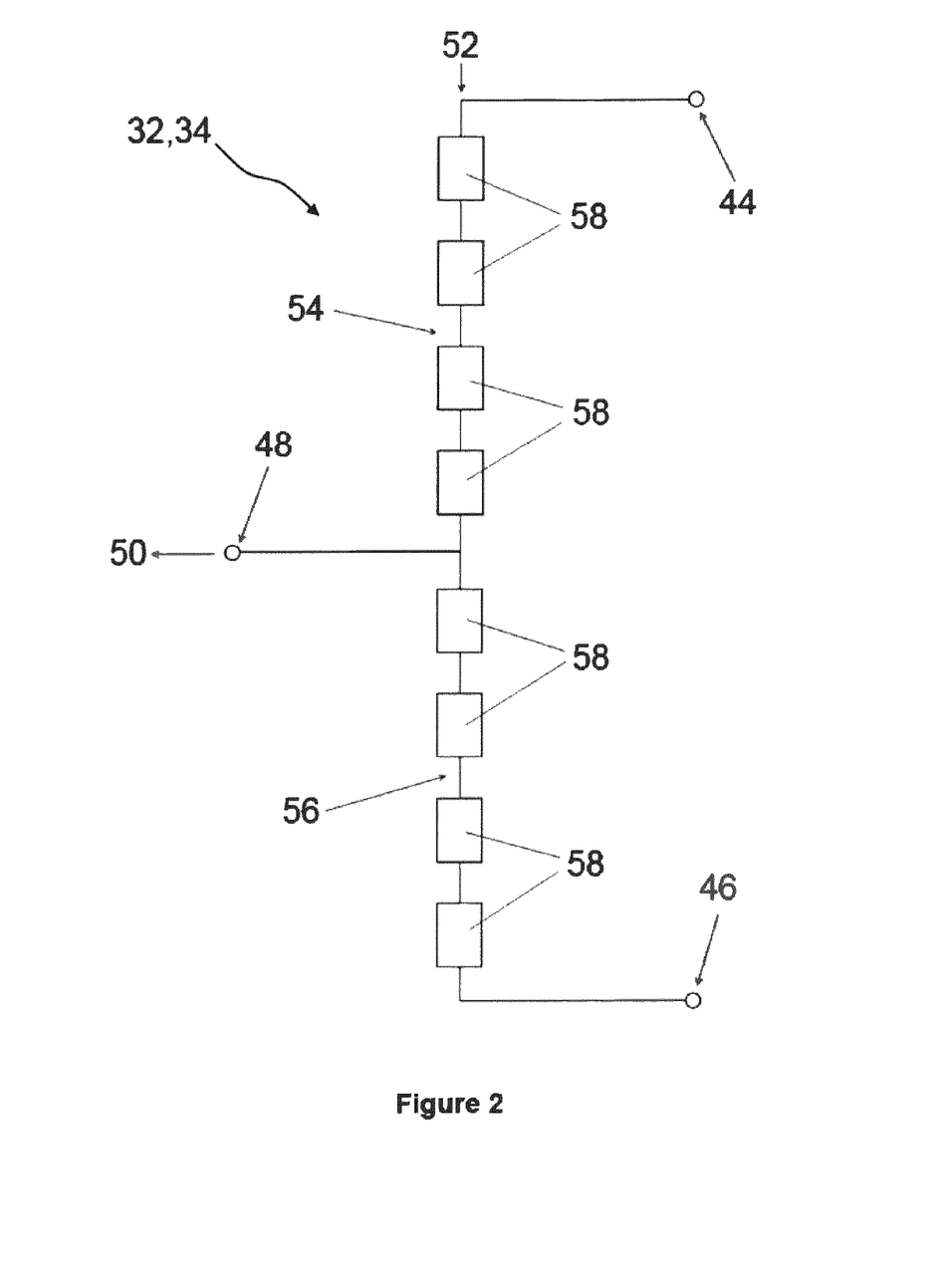
FIG. 2 shows schematically an exemplary converter of the converter scheme of FIG. 1.

Each converter 32,34 includes a first DC terminal 44 and a second DC terminal 46. In addition each converter 32,34 shown in FIG. 1 includes a plurality of AC terminals 48, each of which in use is connected to a respective phase of a respective multi-phase AC network 50. More particularly, each converter 32,34 shown in FIG. 1 defines an AC/DC voltage source converter 32,34 which includes a plurality of converter limbs 52, each of which is arranged as shown in FIG. 2. In other embodiments, it is envisaged that each voltage source converter 32,34 may be replaced by a line commutated converter.

Each converter limb 52 extends between the first and second DC terminals 44,46, and includes a first limb portion 54 that extends between the first DC terminal 44 and the AC terminal 48, and a second limb portion 56 which extends between the second DC terminal 46 and the AC terminal 48.

Each limb portion 54,56 includes a plurality of series-connected switching elements 58, each of which is in the form of a thyristor. It is envisaged that, in other embodiments of the invention, the plurality of series-connected switching elements in each limb portion may be replaced by one or more other types of semiconductor switches, such as insulated gate bipolar transistors (IGBT).

It will be appreciated that the topology of each converter 32,34 is merely chosen to help illustrate the operation of the invention, and that each converter 32,34 may be replaced by another converter with a different topology. For example, each converter 32,34 may be configured as a chain-link converter, such as the Modular Multilevel Converter (MMC) or the Alternate Arm Converter (AAC).

The plurality of poles includes a positive DC pole 60, a negative DC pole 62 and a neutral pole 64.

The first DC terminal 44 of the first converter 32a is connected to the positive DC pole 60, the first DC terminal 44 of the second converter 32b is connected to the negative DC pole 62, and the second DC terminals 46 of the first and second converters 32a,32b are connected to the neutral pole 64.

The first end of the first DC power transmission line 40 is operatively connected to the positive DC pole 60, and the second end of the first DC power transmission line 40 is operatively connected to the first DC terminal 44 of one of the plurality of third converters 34. The first end of the second DC power transmission line 42 is operatively connected to the negative DC pole 62, and the second end of the second DC power transmission line 42 is operatively connected to the first DC terminal 44 of another of the plurality of third converters 34.

The neutral pole 64 is operatively connected to a first end of a high impedance current return path 66, while a second end of the current return path 66 is connected to the second DC terminals 46 of the plurality of third converters 34. The current return path 66 is shown in FIG. 1 as being grounded at its second end, but in other embodiments may be grounded at its first end. The current return path 66 may include a single conductor or multiple parallel-connected conductors, where the or each conductor is in the form of an electrode line or a dedicated metallic return. When the current return path 66 includes multiple parallel-connected conductors, the bipolar converter scheme 30 is operable with one or multiple conductors in service.

The controller 36 is programmed to operate each converter 32,34 to facilitate power transmission between the first and second converters 32a,32b and the third converters 34. More particularly, the controller 36 is programmed to operate each converter 32 to control a respective converter voltage across the corresponding DC terminals 44,46 such that the first converter 32a is able to control a converter voltage across the positive DC and neutral poles 60,64 and that the second converter 32b is able to control a converter voltage across the negative DC and neutral poles 62,64. Also, the controller 36 is programmed to selectively operate each converter 32,34 to change between blocked and deblocked states to control the flow of DC power between the converters 32a,34a and the flow of DC power between the converters 32b,34b.

In use, each of the first and second converters 32a,32b is operated to control the respective converter voltage across the neutral pole 64 and the corresponding positive or negative DC pole 60,62 in order to facilitate power transmission under balanced operating conditions in which the power and current levels of the positive and negative DC poles 60,62 are balanced and in which the neutral pole 64 is at a zero potential $V_n$. Meanwhile the converter voltages are maintained at equal and constant levels throughout the power transmission, and are defined to ensure that the pole-to-ground voltages of the positive and negative DC poles 60,62 do not exceed the voltage ratings of the positive and negative DC poles 60,62 respectively. For the sake of illustration, the voltage ratings of the positive and negative DC poles 60,62 are set at 800 kV, but it will be understood that each voltage rating of the positive and negative DC poles 60,62 may have a different value other than 800 kV.

Figure 3:
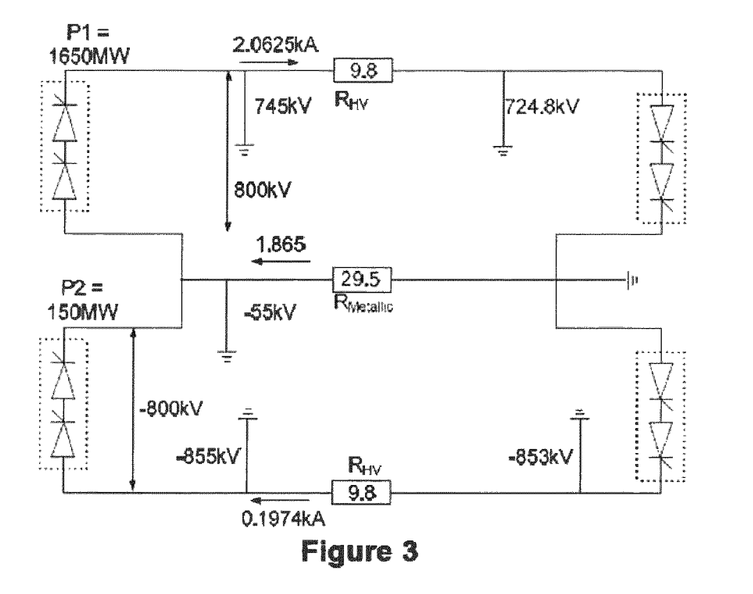
FIG. 3 illustrates an exemplary operation of the converter scheme of FIG. 1 under unbalanced operating conditions when a voltage control mode of the invention is not carried out.

FIG. 3 illustrates an example of unbalanced operating conditions of the bipolar converter scheme 30. In FIG. 3, the positive DC pole 60 is operating at a maximum power level of 1650 MW with an operator-defined converter voltage of 800 kV applied across the positive DC and neutral poles 60,64, and the second DC pole 62 is operating at a minimum power level of 150 MW with an operator-defined converter voltage of 800 kV applied across the negative DC and neutral poles 62,64. A current of 2.0625 kA flows through the first DC power transmission line 40, while a current of 0.1974 kA flows through the second DC power transmission line 42. As a result of the imbalance of the power and current levels between the positive and negative DC poles 60,62, a current of 1.865 kA flows through the current return path 66, which has a maximum resistance of 29.5Ω, such that the neutral pole operates at a non-zero potential $V_n$ of −55 kV.

The presence of the non-zero potential $V_n$ of −55 kV of the neutral pole 64 means that the pole-to-ground voltages of the positive and negative DC poles 60,62 are modified to 745 kV and −855 kV respectively. The increase in the pole-to-ground voltage of the negative DC pole 62 to −855 kV means that the voltage rating of the negative DC pole 62 is exceeded.

Similarly, if the positive DC pole 60 is operating at a minimum power level of 150 MW with a converter voltage of 800 kV applied across the positive DC and neutral poles 60,64, and the second DC pole 62 is operating at a maximum power level of 1650 MW with a converter voltage of 800 kV applied across the negative DC and neutral poles 62,64, the pole-to-ground voltages of the positive and negative DC poles 60,62 are modified to 855 kV and −745 kV respectively, which results in the voltage rating of the positive DC pole 60 being exceeded.

To avoid exceeding the voltage ratings of the positive and negative DC poles 60,62 during the above unbalanced operating conditions, the controller 36 operates in a voltage control mode which is described as follows with reference to FIG. 4.

Based on the imbalance of power and current levels between the positive and negative DC poles 60,62, the current flowing in the current return path 66 can be calculated, predicted or modelled. Based on the configuration of the current return path 66 (i.e. whether one or multiple conductors are in service), the resistance of the current return path 66 can be measured, calculated, predicted or modelled. The non-zero potential $V_n$ of the neutral pole 64 can then be calculated from the determined current flowing in the current return path 66 and the determined resistance of the current return path 66.

The imbalance between the power and current levels of the positive and negative DC poles 60,62 are then evaluated by comparing the power difference ΔP between the power levels of the positive and negative DC poles 60,62 or by comparing the current difference ΔI between the absolute values of the currents flowing at the positive and negative DC poles 60,62, which are the currents flowing through the first and second DC power transmission lines 40,42 respectively.

If the power difference ΔP or the current difference ΔI is equal to or higher than a predefined threshold, then the first converter 32a is operated to control the converter voltage across the positive DC and neutral poles 60,64 to be the operator-defined converter voltage (e.g. 800 kV) while the second converter 32b is operated to control the converter voltage across the negative DC and neutral poles 62,64 to be the lower of: (i) the operator-defined converter voltage and (ii) the difference between a pole-to-ground voltage limit Vdc_limit and the non-zero potential $V_n$ of the neutral pole 64. In this case the pole-to-ground voltage limit Vdc_limit is defined by the voltage rating of the negative DC pole 62.

If the power difference ΔP or the current difference ΔI is lower than a predefined threshold, then the first converter 32a is operated to control the converter voltage across the positive DC and neutral poles 60,64 to be the lower of: (i) the operator-defined converter voltage (e.g. 800 kV) and (ii) the difference between a pole-to-ground voltage limit Vdc_limit and the non-zero potential $V_n$ of the neutral pole 64 while the second converter 32b is operated to control the converter voltage across the negative DC and neutral poles 62,64 to be the operator-defined converter voltage. In this case the pole-to-ground voltage limit Vdc_limit is defined by the voltage rating of the positive DC pole 60.

It will be understood that the direction of current in the current return path 66 can be used to identify which converter 32a,32b is to be operated to control the corresponding converter voltage to be the lower of: (i) the operator-defined converter voltage and (ii) the difference between a pole-to-ground voltage limit Vdc_limit and the non-zero potential $V_n$ of the neutral pole 64. More particularly, the second converter 32b is controlled in this manner if the current is flowing towards the first end of the current return path 66, and the first converter 32a is controlled in this manner if the current is flowing towards the second end of the current return path 66.

Figure 4:
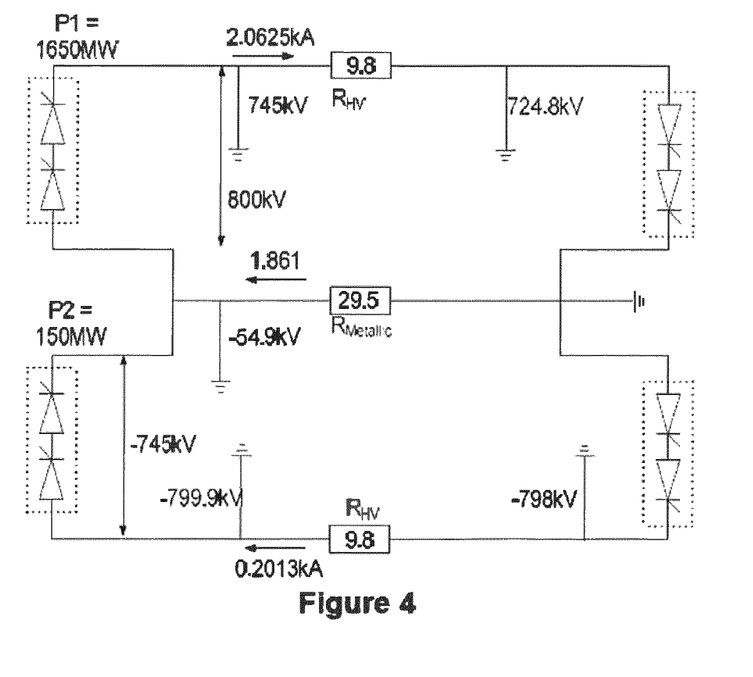
FIG. 4 illustrates an exemplary operation of the converter scheme of FIG. 1 under unbalanced operating conditions when a voltage control mode of the invention is carried out.

FIG. 4 illustrates the performance of the voltage control mode during the above unbalanced operating conditions of the bipolar converter scheme 30. In FIG. 4, the positive DC pole 60 is operating at a maximum power level of 1650 MW with the operator-defined converter voltage of 800 kV applied across the positive DC and neutral poles 60,64, and the second DC pole 62 is operating at a minimum power level of 150 MW with the controller-defined converter voltage of −745 kV applied across the negative DC and neutral poles 62,64. The controller-defined converter voltage here is the difference between the voltage rating of the negative DC pole 62 of −800 kV and the non-zero potential $V_n$ of the neutral pole 64 of 55 kV. A current of 2.0625 kA flows through the first DC power transmission line 40, while an increased current of 0.2013 kA flows through the second DC power transmission line 42. The pole-to-ground voltages of the positive and negative DC poles 60,62 are 745 kV and −799.9 kV respectively.

The performance of the voltage control mode during unbalanced operating conditions of the bipolar converter scheme 30 therefore avoids the risk of exceeding the pole-to-ground voltages of the positive and negative DC poles 60,62, and thereby improves the reliability and availability of the bipolar converter scheme 30 by enabling the bipolar converter scheme 30 to facilitate power transmission under the unbalanced operating conditions.

In addition the performance of the voltage control mode enables the bipolar converter scheme 30 to employ converter voltages which have the effect of reducing operating losses of the bipolar converter scheme 30 arising from the unbalanced operating conditions when compared to the scenario in which the bipolar converter scheme 30 under the unbalanced operating conditions continues to employ the converter voltages which were also used during the balanced operating conditions.

Optionally the controller 36 may be programmed to periodically update the resistance of the current return path 66 to take into account changes in operating parameters of the current return path 66, such as the temperature of the current return path 66 and the current flowing through the current return path 66. This may be done by dividing the difference in voltages at both ends of the current return path 66 by the current flowing through the current return path 66. This enables the voltage control mode to be implemented on the basis of a non-zero potential reference value which accurately reflects the actual non-zero potential $V_n$ of the neutral pole 64.

Further optionally the controller 36 may be programmed to use the obtained resistance of the current return path 66 to update a resistance calculation equation or lookup table so that the controller 36 is equipped with an intelligent learning mechanism which ensures a more accurate determination of the non-zero potential $V_n$ of the neutral pole 64.

Even more further optionally the controller 36 in the voltage control mode may be programmed to use the maximum resistance of the current return path 66 with respect to ambient temperature and for a given conductor configuration of the current return path 66, which can be modelled using software as a pre-calculated lookup table or equation. This has the benefit of simplifying the determination of the non-zero potential $V_n$ of the neutral pole 64 for use as a reference value in the voltage control mode.

Figure 5:
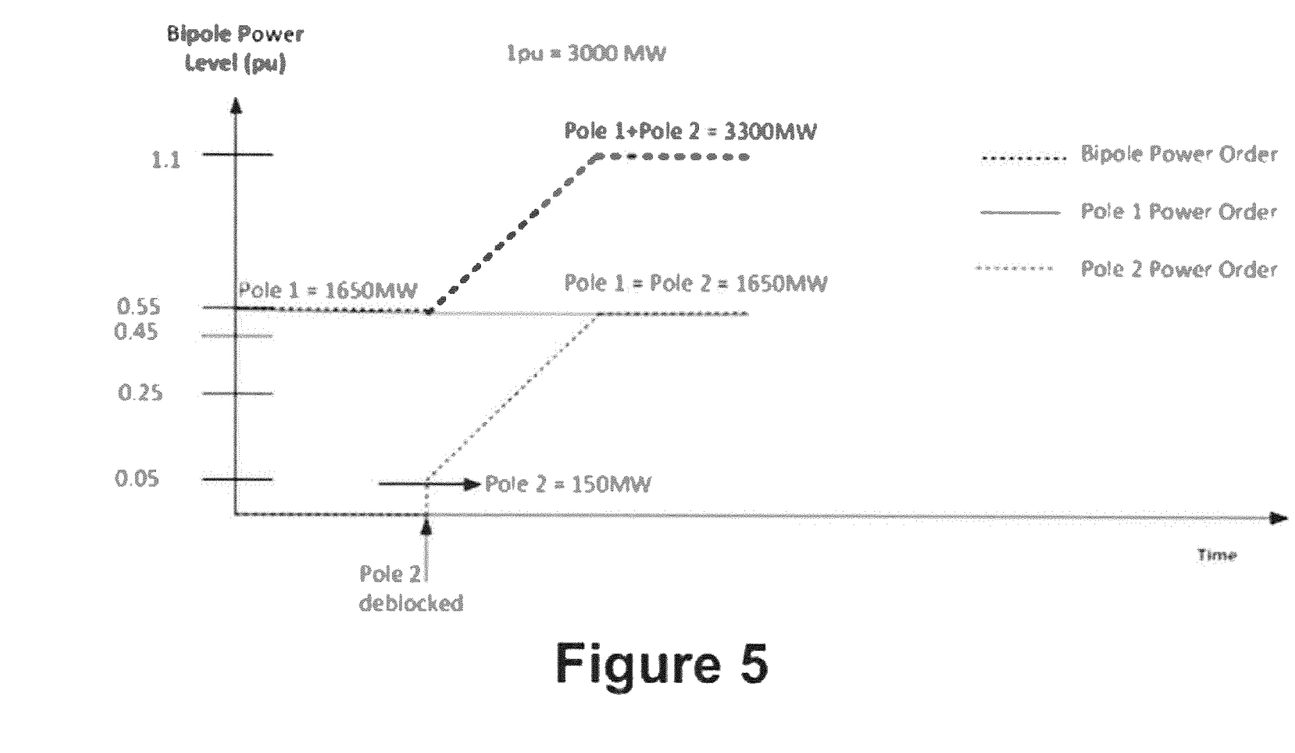
FIG. 5 illustrates an example of unbalanced operating conditions of the converter scheme of FIG. 1.
Figure 6:
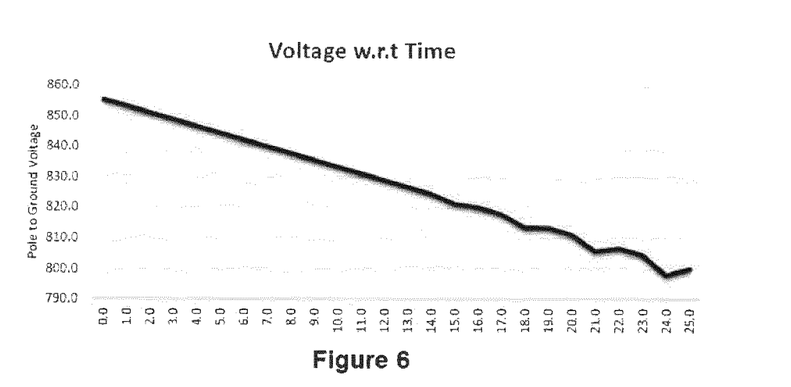
FIG. 6 illustrates an exemplary operation of the converter scheme of FIG. 1 under the unbalanced operating conditions of FIG. 5 when a voltage control mode of the invention is not carried out.

FIG. 5 illustrates another example of unbalanced operating conditions of the bipolar converter scheme 30. In FIG. 5, the positive DC pole 60 is operating at a maximum power level of 1650 MW with an operator-defined converter voltage of 800 kV applied across the positive DC and neutral poles 60,64, and the second converter 32b and therefore the negative DC pole 62 are initially blocked. After the second converter 32b and therefore the negative DC pole 62 are deblocked, the power level of the negative DC pole 62 is instantaneously raised to 150 MW before being ramped up to 1650 MW at a ramp rate of 60 MW per minute to achieve the desired bipole power level of 3300 MW and restore the bipolar converter scheme 30 to balanced operating conditions. However, before the bipolar converter scheme 30 is restored to balanced operating conditions, the imbalance between the power levels of the positive and negative DC poles 60,62 during the ramp up of the power level of the negative DC pole 62 from 150 MW to 1650 MW results in the pole-to-ground voltage of the negative DC pole 62 exceeding the voltage rating of the negative DC pole 62 of 800 kV, as shown in FIG. 6.

To avoid exceeding the voltage ratings of the positive and negative DC poles 60,62 during the above unbalanced operating conditions, the controller 36 operates in a voltage control mode which is described as follows with reference to FIG. 7.

Again, based on the imbalance of power and current levels between the positive and negative DC poles 60,62, the current flowing in the current return path 66 can be calculated, predicted or modelled. Based on the configuration of the current return path 66 (i.e. whether one or multiple conductors are in service), the resistance of the current return path 66 can be measured, calculated, predicted or modelled. The non-zero potential $V_n$ of the neutral pole 64 can then be calculated from the determined current flowing in the current return path 66 and the determined resistance of the current return path 66.

The first converter 32a is operated to control the converter voltage across the positive DC and neutral poles 60,64 to be the operator-defined converter voltage (e.g. 800 kV). Meanwhile the second converter 32b is operated to control the converter voltage across the negative DC and neutral poles 62,64 to be the lower of: (i) the operator-defined converter voltage and (ii) the difference between a pole-to-ground voltage limit Vdc_limit and the non-zero potential $V_n$ of the neutral pole 64. In this case the pole-to-ground voltage limit Vdc_limit is defined by the voltage rating of the negative DC pole 62.

Figure 7:
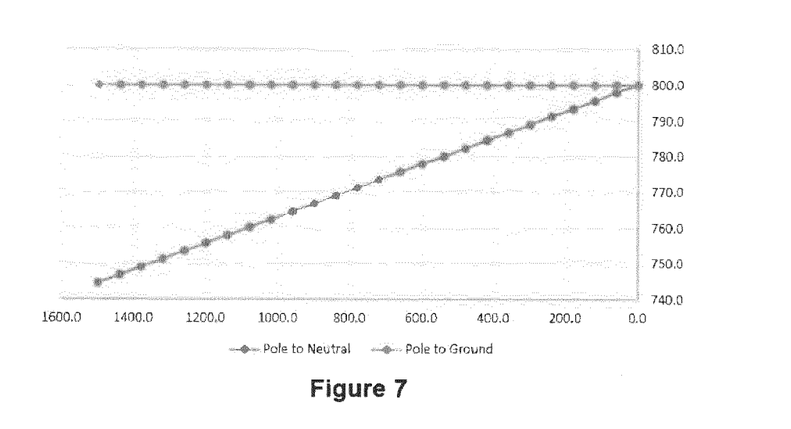
FIG. 7 illustrates an exemplary operation of the converter scheme of FIG. 1 under the unbalanced operating conditions of FIG. 5 when a voltage control mode of the invention is carried out.

FIG. 7 illustrates the performance of the voltage control mode during the above unbalanced operating conditions of the bipolar converter scheme 30. In FIG. 7, the magnitude of the pole-to-neutral of the negative DC pole 62, (i.e. the converter voltage across the negative and neutral DC poles 62,64) is controlled to vary from 745 kV to 800 kV during the ramp up of the power level of the negative DC pole 62 from 150 MW to 1650 MW, while the magnitude of the pole-to-ground voltage of the negative DC pole 62 stays at a constant level of 800 kV. In other words, the controller 36 in the voltage control mode operates the second converter 32b to dynamically vary its converter voltage during the ramp up of the power level of the negative DC pole 62 to maintain the pole-to-ground voltage of the negative DC pole 62 to be equal to or lower than the voltage rating of the negative DC pole 62. This not only enables optimisation of the power transmission performance of the bipolar converter scheme 30 during the ramp up of the power level of the negative DC pole 62, but enables gradual restoration of the bipolar converter scheme 30 to the balanced operating conditions.

The described voltage control mode applies mutatis mutandis to unbalanced operating conditions in which the negative DC pole 62 is operating at a maximum power level of 1650 MW with an operator-defined converter voltage of 800 kV applied across the negative DC and neutral poles 62,64, and the first converter 32a and therefore the positive DC pole 60 are initially blocked and then deblocked before ramping up the power level of the positive DC pole 60 to 1650 MW.

It is envisaged that, in other embodiments of the invention, the first converter 32a may be replaced by a plurality of parallel-connected first converters while the positive DC pole 60 may be replaced by a plurality of positive DC poles, with each of the first converters being connected to a respective one of the plurality of positive DC poles, and/or the second converter 32b may be replaced by a plurality of parallel-connected second converters while the negative DC pole 62 may be replaced by a plurality of negative DC poles, with each of the second converters being connected to a respective one of the plurality of negative DC poles. Optionally each third converter 34 may be replaced by a plurality of parallel-connected third converters. In such embodiments, the controller may be programmed to perform the voltage control mode when there is an imbalance between a sum of power or current levels of the positive poles and a sum of power or current levels of the negative poles.

Figure 8:
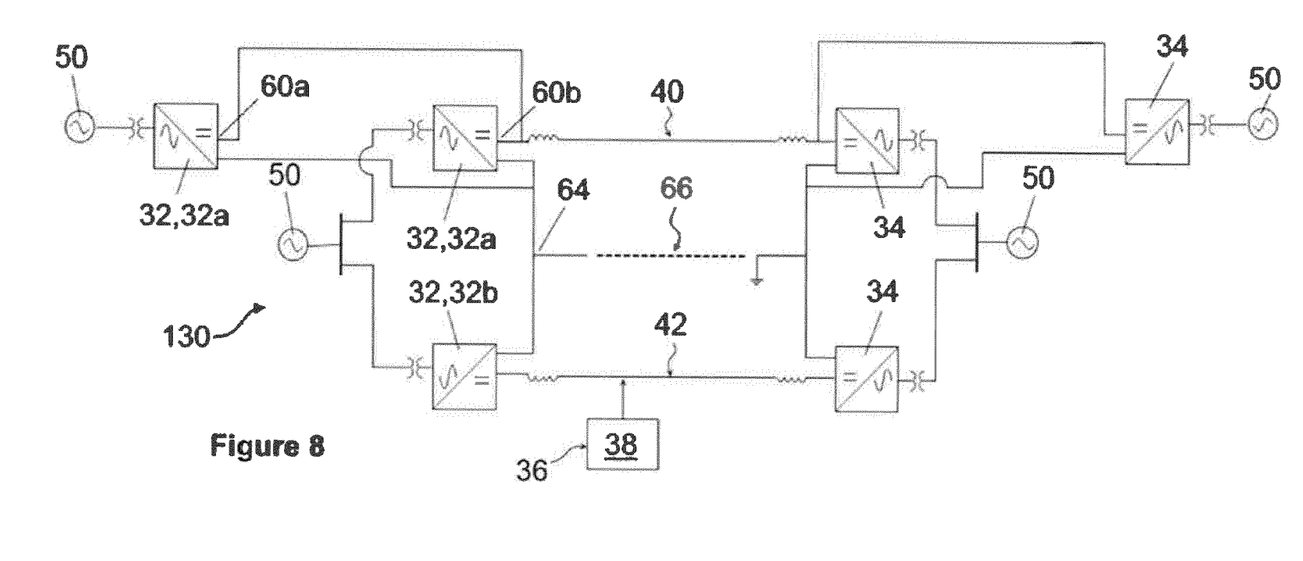
FIG. 8 shows schematically a converter scheme according to a second embodiment of the invention.

A bipolar converter scheme according to a second embodiment of the invention is shown in FIG. 8 and is designated generally by the reference numeral 130. The bipolar converter scheme 130 of FIG. 8 is similar in structure and configuration to the bipolar converter scheme 30 of FIG. 1, and like features share the same reference numerals.

The bipolar converter scheme 130 of FIG. 8 differs from the bipolar converter scheme of FIG. 1 in that the bipolar converter scheme 130 of FIG. 8 includes a plurality of parallel-connected first converters 32a and a plurality of positive DC poles 60a,60b. Each of the parallel-connected first converters 32a is connected to a respective one of the positive DC poles 60a,60b. Each first converter 32 is connected to a respective multi-phase AC network 50.

Figure 9:
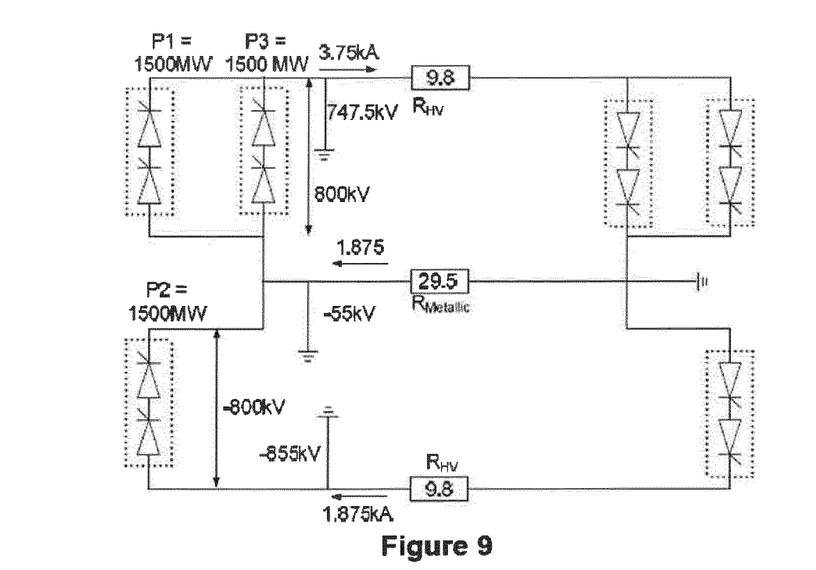
FIG. 9 illustrates an exemplary operation of the converter scheme of FIG. 8 under unbalanced operating conditions when a voltage control mode of the invention is not carried out.

FIG. 9 illustrates an example of unbalanced operating conditions of the bipolar converter scheme 130. In FIG. 9, each of the positive DC poles 60a,60b is operating at a power level of 1500 MW with an operator-defined converter voltage of 800 kV applied across the positive DC and neutral poles 60a,60b,64, and the second DC pole 62 is operating at a power level of 1500 MW with an operator-defined converter voltage of 800 kV applied across the negative DC and neutral poles 62,64. A current of 3.75 kA flows through the first DC power transmission line 40, while a current of 1.875 kA flows through the second DC power transmission line 42. As a result of the imbalance of the power and current levels between the positive and negative DC poles 60a,60b,62, a current of 1.875 kA flows through the current return path 66, which has a maximum resistance of 29.5Ω, such that the neutral pole operates at a non-zero potential $V_n$ of −55 kV.

The presence of the non-zero potential $V_n$ of −55 kV of the neutral pole 64 means that the pole-to-ground voltages of the positive DC poles are modified to 747.5 kV while the pole-to-ground voltage of the negative DC pole 62 is modified to −855 kV. The increase in the pole-to-ground voltage of the negative DC pole 62 to −855 kV means that the voltage rating of the negative DC pole 62 is exceeded.

To avoid exceeding the voltage rating of the positive and negative DC poles 60a,60b,62 during the above unbalanced operating conditions, the controller 36 operates in a voltage control mode which is described as follows with reference to FIG. 10.

Based on the imbalance of power and current levels between the positive and negative DC poles 60a,60b,62, the current flowing in the current return path 66 can be calculated, predicted or modelled. Based on the configuration of the current return path 66 (i.e. whether one or multiple conductors are in service), the resistance of the current return path 66 can be measured, calculated, predicted or modelled. The non-zero potential $V_n$ of the neutral pole 64 can then be calculated from the determined current flowing in the current return path 66 and the determined resistance of the current return path 66.

The imbalance between the power and current levels of the positive and negative DC poles 60a,60b,62 are then evaluated by either comparing the power difference ΔP between the sum of the power levels of the positive DC poles 60a,60b and the power level of the negative DC pole 62 or comparing the current difference ΔI between the absolute values of the currents flowing at the positive and negative DC poles 60a,60b,62, which are the currents flowing through the first and second DC power transmission lines 40,42 respectively.

If the power difference ΔP or the current difference ΔI is equal to or higher than a predefined threshold, then each first converter 32a is operated to control the converter voltage across the corresponding positive DC and neutral poles 60a,60b,64 to be the operator-defined converter voltage (e.g. 800 kV) while the second converter 32b is operated to control the converter voltage across the negative DC and neutral poles 62,64 to be the lower of: (i) the operator-defined converter voltage and (ii) the difference between a pole-to-ground voltage limit Vdc_limit and the non-zero potential $V_n$ of the neutral pole 64. In this case the pole-to-ground voltage limit Vdc_limit is defined by the voltage rating of the negative DC pole 62.

If the power difference ΔP or the current difference ΔI is lower than a predefined threshold, then each first converter 32a is operated to control the converter voltage across the corresponding positive DC and neutral poles 60,60b,64 to be the lower of: (i) the operator-defined converter voltage (e.g. 800 kV) and (ii) the difference between a pole-to-ground voltage limit Vdc_limit and the non-zero potential $V_n$ of the neutral pole 64 while the second converter 32b is operated to control the converter voltage across the negative DC and neutral poles 62,64 to be the operator-defined converter voltage. In this case the pole-to-ground voltage limit Vdc_limit is defined by the voltage rating of the positive DC pole 60a,60b.

Figure 10:
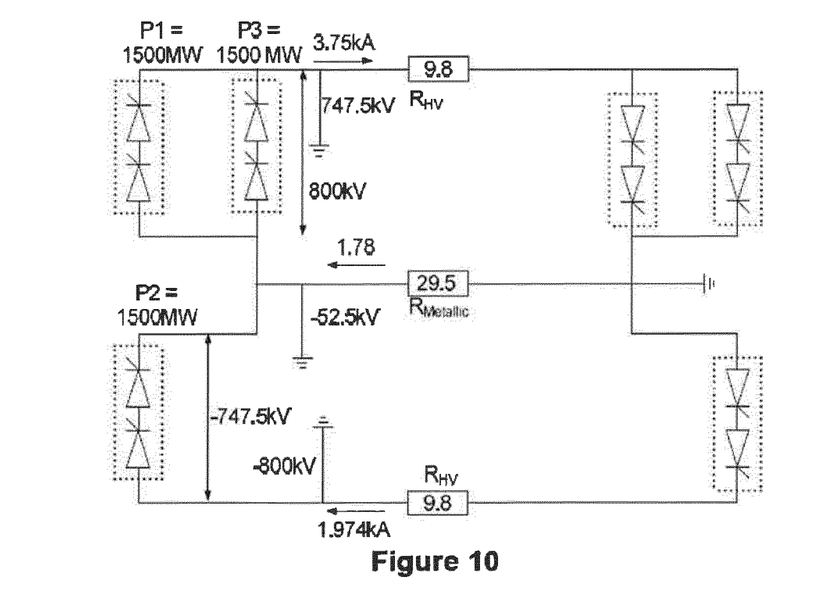
FIG. 10 illustrates an exemplary operation of the converter scheme of FIG. 8 under unbalanced operating conditions when a voltage control mode of the invention is carried out.

FIG. 10 illustrates the performance of the voltage control mode during the above unbalanced operating conditions of the bipolar converter scheme 130. In FIG. 10, each positive DC pole 60a,60b is operating at a power level of 1500 MW with the operator-defined converter voltage of 800 kV applied across the corresponding positive DC and neutral poles 60a,60b,64, and the second DC pole 62 is operating at a power level of 150 MW with the controller-defined converter voltage of −747.5 kV applied across the negative DC and neutral poles 62,64. Under such unbalanced operating conditions, the non-zero potential $V_n$ of the neutral pole 64 is −52.5 kV. The controller-defined converter voltage here is the difference between the voltage rating of the negative DC pole 62 of 800 kV and the non-zero potential $V_n$ of the neutral pole 64 of −52.5 kV. A current of 3.75 kA flows through the first DC power transmission line 40, while an increased current of 1.974 kA flows through the second DC power transmission line 42. The pole-to-ground voltages of the positive and negative DC poles 60,62 are 747.5 kV and −800 kV respectively.

The performance of the voltage control mode during unbalanced operating conditions of the bipolar converter scheme '30 therefore avoids the risk of exceeding the pole-to-ground voltages of the positive and negative DC poles 60a,60b,62.

The described voltage control mode applies mutatis mutandis to other variations of the bipolar converter scheme 130. In one such variation, the bipolar converter scheme includes a single first converter connected to a single positive DC pole, and includes multiple second converters respectively connected to multiple negative DC poles. In another such variation, the bipolar converter scheme includes multiple first converters respectively connected to multiple positive DC poles, and includes multiple second converters respectively connected to multiple negative DC poles, where the number of first converters is unequal to the number of second converters.

It will be appreciated that each of the numerical values used to describe the above embodiments are merely chosen to help illustrate the working of the invention, and may be replaced by another suitable numerical value. It will be further appreciated that the topologies of the converter schemes are merely chosen to help illustrate the working of the invention, and may be replaced by other suitable topologies.

The invention claimed is:

1. A converter scheme comprises:
  a plurality of poles and a plurality of converters, the plurality of poles including at least one positive pole, at least one negative pole, and a neutral pole, and the plurality of converters including at least one first AC to DC converter, at least one second AC to DC converter, and at least one DC to AC converter, the at least one first AC to DC converter connected to the neutral pole and the at least one positive pole,
  the at least one first AC to DC converter operable to control a respective converter voltage across the neutral pole and the at least one positive pole,
  the at least one second AC to DC converter connected to the neutral pole and the at least one negative pole, the at least one second AC to DC converter operable to control a converter voltage across the neutral pole and the at least one negative pole, the converter scheme further comprising a conductor path, the conductor path having a first end operator connected to the neutral pole while a second end of the conductor path is connected to a terminal of the DC to AC converters,
  wherein the converter scheme includes a controller programmed to perform a voltage control mode when there is an imbalance between power or current levels of the at least one positive pole and at least one negative pole, such that the current flows through the conductor path and the neutral pole is at a non-zero potential ($V_n$), and
  the controller programmed to perform the voltage control mode to operate each of the plurality of converters to control the respective converter voltage so that a pole-to-ground voltage of the at least one positive pole or the at least one negative pole is equal to or lower than a voltage rating of the at least one positive pole or the at least one negative pole,
    wherein the controller is configured to determine a non-zero potential (V) of the neutral pole,
    the scheme being further configured to identify a converter to be operated between the first AC to DC converter and the second AC to DC converter according to a current direction in the conductor path, and to control a respective converter voltage of the identified voltage converter to be the lower of: (i) an operator-defined converter voltage and (ii) a difference between a pole-to-ground voltage limit (Vdc) limit and the determined non-zero potential $V_n$, of the neutral pole.

2. The converter scheme in claim 1, wherein the controller is programmed to perform the voltage control mode to operate the plurality of converters to update the respective converter voltage in real-time in response to a change in the imbalance between the power or current levels of the at least one positive pole and the at least one negative pole so that the pole-to-ground voltage of the at least one positive pole and the at least one negative pole is equal to or lower than the voltage rating of the at least one positive pole and the at least one negative pole.

3. The converter scheme in claim 2, wherein the number of first AC to DC converters is unequal to the number of second AC to DC converters, and wherein the controller is programmed to perform the voltage control mode when there is an imbalance between:
- a sum of power or current levels of the positive poles and a power or current level of the negative pole;
- a power or current level of the positive pole and a sum of power or current levels of the negative poles; or
- a sum of power or current levels of the positive poles and a sum of power or current levels of the negative poles.

4. The converter scheme in claim 1, wherein the controller is programmed to perform the voltage control mode to operate at least one of the plurality of converters to reduce the corresponding converter voltage, and increase a current of the at least one positive pole and the at least one negative pole, wherein:
- the pole-to-ground voltage of the at least one positive pole or the at least one negative pole is equal to or lower than the voltage rating of the at least one positive pole and the at least one negative pole; and/or
- a current in the neutral pole is equal to or lower than the current rating of a conductor of the neutral pole.

5. The converter scheme in claim 1, wherein the number of first AC to DC converters is equal to the number of second AC to DC converters, and wherein the controller is programmed to perform the voltage control mode when there is an imbalance between:
- a power or current level of the positive pole and a power or current level of the negative pole; or
- a sum of power or current levels of the positive poles and a sum of power or current levels of the negative poles.

6. The converter scheme in claim 1, wherein the controller is programmed to perform the voltage control mode to operate at least one of the converters to vary the corresponding converter voltage during a change in power or current level of at least one of the positive and negative poles and when there is an imbalance between the power or current levels of the positive and negative poles during the change in power or current level of the at least one of the positive and negative poles.

7. The converter scheme in claim 1, wherein the controller is programmed to use the non-zero potential ($V_n$) of the neutral pole as a reference value in the voltage control mode to operate at least one of the converters to control the corresponding converter voltage so that the pole-to-ground voltage of the corresponding positive or negative pole is equal to or lower than the voltage rating of the corresponding positive or negative pole.

8. The converter scheme in claim 1, wherein the controller is programmed to obtain or determine one or more operating parameters of the neutral pole and to use the or each obtained or determined operating parameter of the neutral pole to determine the non-zero potential ($V_n$) of the neutral pole.

9. The converter scheme in claim 8, wherein the controller is programmed to update the determined non-zero potential ($V_n$) of the neutral pole in real-time in response to at least one change in operating parameter of the neutral pole.

10. The converter scheme in claim 8, wherein the controller is programmed to obtain or determine a current of the neutral pole and to use the obtained or determined current of the neutral pole to determine the non-zero potential ($V_n$) of the neutral pole.

11. The converter scheme in claim 8, further including a conductor connected to the neutral pole, wherein the controller is programmed to obtain or determine a resistance or impedance of the conductor and to use the obtained or determined resistance or impedance of the conductor to determine the non-zero potential ($V_n$) of the neutral pole.

12. The converter scheme in claim 11, wherein the controller is programmed to update the obtained or determined resistance or impedance of the conductor in real-time in response to at least one change in operating parameter of the conductor.

13. The converter scheme in claim 11, further including a measurement device configured to measure an electrical characteristic of the conductor to obtain the resistance or impedance of the conductor, wherein the controller is programmed to use the obtained resistance or impedance of the conductor to update a procedure of determining the resistance or impedance of the conductor.

14. The converter scheme in claim 11, wherein the controller is programmed to obtain or determine a maximum resistance or impedance of the conductor and to use the obtained or determined maximum resistance or impedance of the conductor to determine the non-zero potential ($V_n$) of the neutral pole.

15. A method of operating a converter scheme, the converter scheme comprising a plurality of poles and a plurality of converters, the plurality of poles including at least one positive pole, at least one negative pole and a neutral pole, the plurality of converters including at least one first AC to DC converter, at least one DC to AC converter, and at least one second AC to DC converter, the or each first AC to DC converter connected to the neutral pole and the or the respective positive pole, the or each second AC to DC converter connected to the neutral pole and the or the respective negative pole, the converter scheme further comprising a conductor path, the conductor path having a first end operator connected to the neutral pole while a second end of the conductor path is connected to a terminal of the DC to AC converters, wherein the method comprises:
- operating the or each first AC to DC converter to control a converter voltage across the neutral pole and the corresponding positive pole;
- operating the or each second AC to DC converter to control a converter voltage across the neutral pole and the corresponding negative pole; and
- when there is an imbalance between power or current levels of the positive and negative poles such that the current flows through the conductor path and when the neutral pole is at a non-zero potential ($V_n$), performing a voltage control mode to operate each converter to control the corresponding converter voltage so that a pole-to-ground voltage of the corresponding positive or negative pole is equal to or lower than a voltage rating of the corresponding positive or negative pole.

* * * * *